United States Patent [19]
Goodrich et al.

[11] Patent Number: 5,375,076
[45] Date of Patent: Dec. 20, 1994

[54] COMBINED NOTEPAD AND NOTEBOOK COMPUTER

[75] Inventors: D. Stephen Goodrich, The Woodlands; Drew D. Granzow; Kevin W. Mundt, both of Spring; Neil L. Condra, The Woodlands; Chris F. Felcman, Spring; Mark S. Tracy; Sam D. Blackwell, both of Tomball; Earl W. Moore, Houston, all of Tex.

[73] Assignee: Compaq Computer Corporation, Houston, Tex.

[21] Appl. No.: 119,865

[22] Filed: Sep. 10, 1993

[51] Int. Cl.5 ............................... G06F 1/00
[52] U.S. Cl. .................. 364/708.1; 361/680; 361/681
[58] Field of Search .......... 364/708.1; 361/680, 361/681, 683

[56] References Cited

U.S. PATENT DOCUMENTS

| | | | |
|---|---|---|---|
| 4,617,640 | 10/1986 | Kish et al. | 364/708.1 X |
| 4,883,376 | 11/1989 | Iwase et al. | 361/680 X |
| 4,903,221 | 2/1990 | Krenz | 364/708.1 X |
| 5,100,098 | 3/1992 | Hawkins | 364/708.1 X |
| 5,103,376 | 4/1992 | Blonder | 364/708.1 X |
| 5,200,913 | 4/1993 | Hawkins et al. | 361/681 |
| 5,224,060 | 6/1993 | Ma | 364/705.03 X |
| 5,255,214 | 10/1993 | Ma | 364/708.1 |

OTHER PUBLICATIONS

DFM Systems, Inc., "Touch The Power!" Brochure For Travelite 286, Date Before Sep. 10, 1993.
AST Research, Inc., "Grid Convertible 486" Brochure, Date Before Sep. 10, 1993.

Primary Examiner—Tan V. Mai
Attorney, Agent, or Firm—Pravel, Hewitt, Kimball & Krieger

[57] ABSTRACT

A computer systems which combines the capabilities of both notepad and notebook computers. The main housing includes an liquid crystal display display with a digitizer input to be used as the display in all modes and the input device when used with a stylus in notepad mode. Also located in the main housing are a floppy disk drive, a hard disk drive, an optional modem unit, batteries, and the electronics of the computer. The main housing contains a recessed portion for receiving a detachable keyboard. The keyboard includes a pivoting, mating extension which is received in the recess so that the keyboard is retained in the recess during storage conditions and in some cases of use, where the housing acts as a partial keyboard support to allow angling of the keyboard. The keyboard contains pivoting legs so that the keyboard can be used remotely from the main housing and yet be angled. The main housing contains a pivoting portion which can operate as a stand when the computer is being operated with the keyboard, so that the display is properly angled for viewing by the user. The pivoting portion can also be pivoted to a position generally parallel with the main housing, but having a portion extending past the housing to act as a handle.

21 Claims, 8 Drawing Sheets

COMBINED NOTEPAD AND NOTEBOOK COMPUTER

BACKGROUND OF THE INVENTION

1. Field of the Invention

The invention relates to portable computer systems, and more particularly to a computer system which can function as a notepad computer and includes provisions for receiving and storing a keyboard to operate as a notebook computer.

2. Description of the Related Art

Portable computer systems are becoming more powerful, smaller and lighter with each few months. Notebook computers have been available for some time. They are generally about 8½×11 inches in width and length and 1½ to 2 inches thick. They include an liquid crystal display (LCD) screen, a keyboard, a floppy disk and or hard disk and various other ports and items standard on desktop computers. Typically they weigh from 5 to 9 pounds, including batteries. Data input and application interaction is generally accomplished by using the keyboard. One problem has been the need to learn to type to efficiently operate the system and the need of a stable location for the computer when you must type. However, keyboard input is often very precise, so that complicated commands can be entered without numerous errors.

One newer arrival in the class of portable computer systems is the slate or notepad computer. In this type of computer a stylus is used to write directly on the LCD screen used in the unit. A digitizer captures the movements of the stylus and software in the computer converts the movement to commands, either by monitoring location when the system is being used in a touch screen-like mode, or by converting the movements into specific characters, which then form the command or data. Thus there is no reason to learn to type. By using the computer as a notepad, no resting space is required for operation of the unit. However, very specialized software is required, the processing may be slow, characters may be misinterpreted and various other problems may occur. One advantage of a notepad is that the unit may be very small.

One problem is that computers are built to be either notepads, and not use a keyboard, or as notebooks, which require use of the keyboard. Thus there is no crossover and a user is forced to select or spend significantly more money to obtain both units.

SUMMARY OF THE INVENTION

Computer systems according to the present invention combine the capabilities of both notepad and notebook computers. The main components of the computer are organized to operate as a notepad computer, but provisions are made for the storage and connection of a keyboard so that typed data entry is also available.

The main assembly is that of a notepad computer. The main housing includes an LCD display with a digitizer to be used as the display in all modes and the input device when used with a stylus in notepad mode. Also located in the main housing are a floppy disk drive, a hard disk drive, an optional modem unit, batteries, and, of course, the electronics of the computer.

In one embodiment the main housing also contains a recessed portion for receiving a detachable keyboard. The keyboard includes a mating extension which is received in the recess, the extension preferably pivoting, so that the keyboard is retained in the recess during storage conditions and in some cases of use, where the housing acts as a partial keyboard support to allow angling of the keyboard. Alternatively, the main housing can contain projectable tabs which mate with recesses or slots in the keyboard to provide the pivoting and partial support functions. Additionally, the keyboard contains pivoting legs or cable cover so that the keyboard can be used remotely from the main housing and yet be angled. The keyboard at one edge may also contain a pivoting assembly which provides a temporary storage location for the stylus. In addition, the main housing contains a pivoting portion which can operate as a stand when the computer is being operated with the keyboard, so that the display is properly angled for viewing by the user. preferably the pivoting portion can also be pivoted to a position generally parallel with the main housing, but having a portion extending past the housing to act as a handle to allow easy transport of the computer.

BRIEF DESCRIPTION OF THE FIGURES

A better understanding of the present invention can be obtained with the following detailed description of the preferred embodiment is considered in conjunction with the following drawings, in which.

DETAILED DESCRIPTION OF THE EMBODIMENTS

Figures 1, 2, 3, 4, 5:
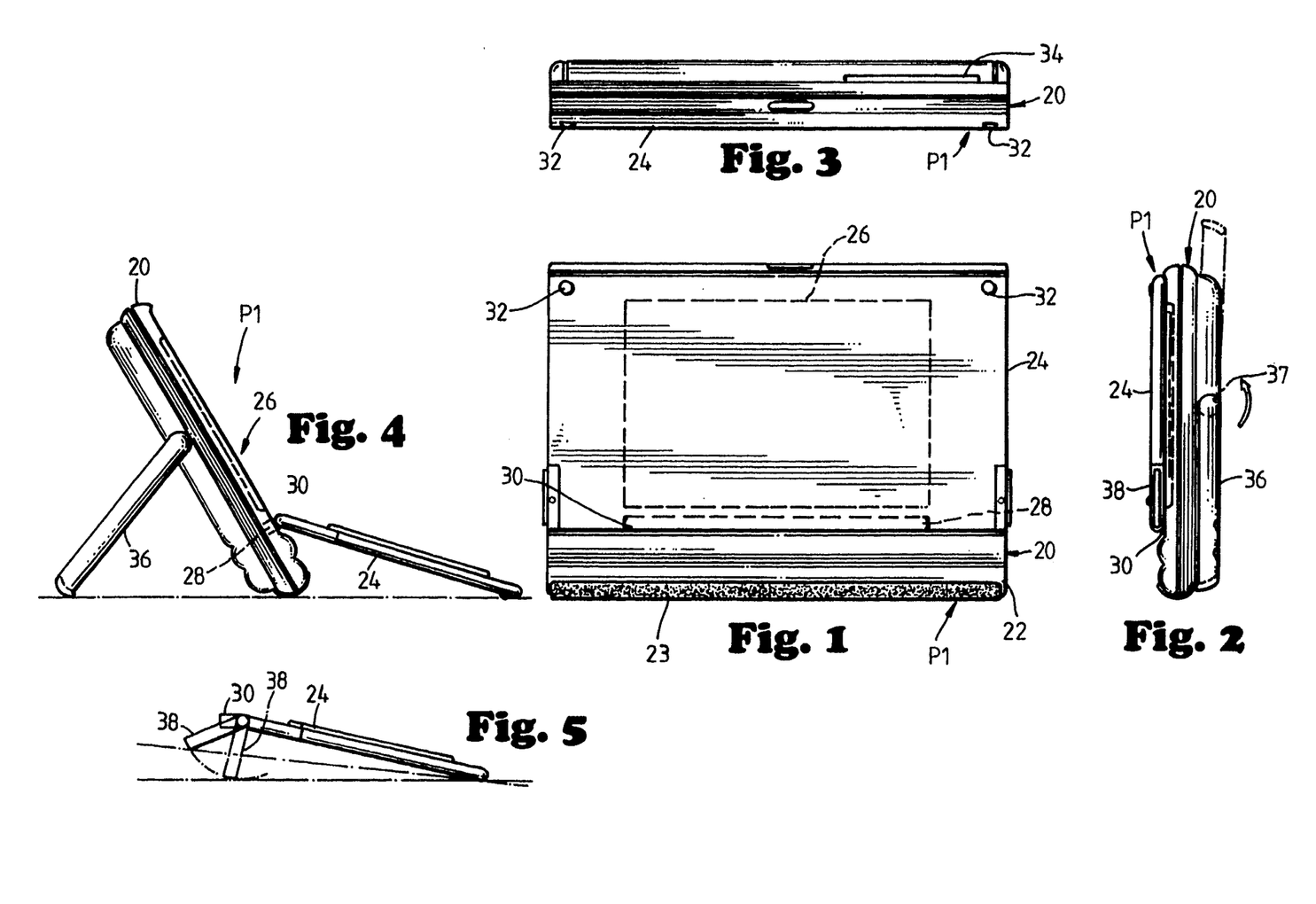
FIG. 1 is a top view of a portable computer according to the present invention with the keyboard installed.
FIG. 2 is a side view of the portable computer of FIG. 1.
FIG. 3 is a front view of the computer of FIG. 1.
FIG. 4 is a side view of the computer of FIG. 1 in notebook mode with the keyboard secured in the front of the computer and the computer propped at an angle.
FIG. 5 is an illustration of the keyboard separated from the computer and showing alternative settings for the legs of the keyboard.
Figures 6, 9:
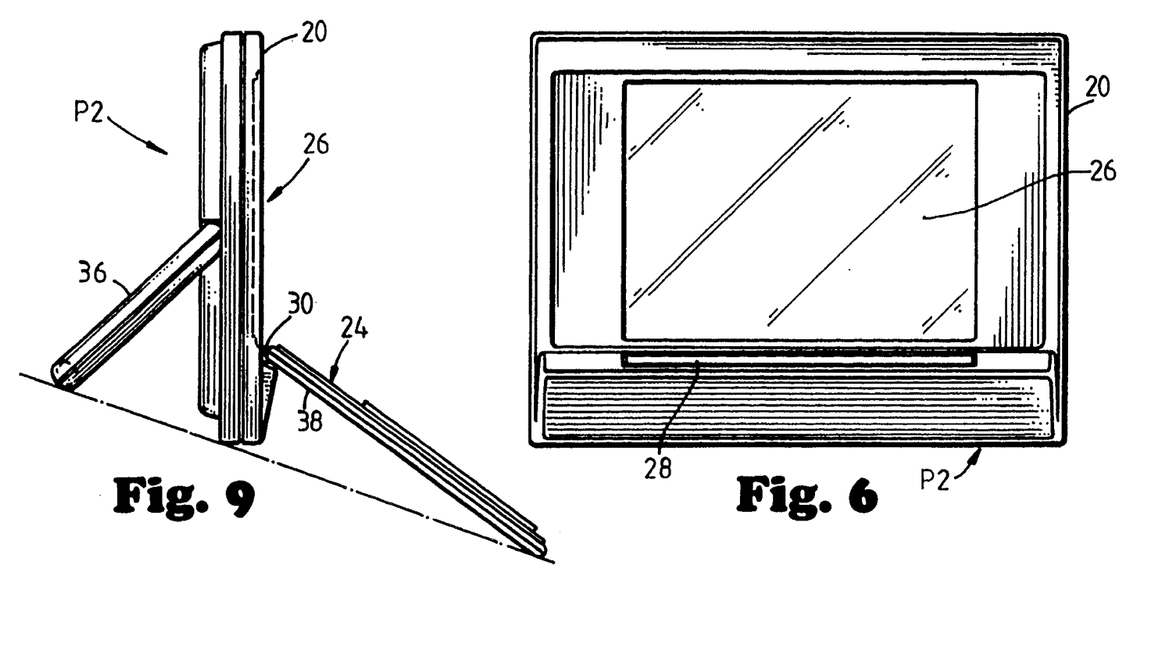
FIG. 6 is a top view of an alternate embodiment of a portable computer according to the present invention with the keyboard removed.
FIG. 9 is a side view of the computer of FIG. 6 in notebook mode with the keyboard inserted into the computer and the computer propped at an angle.
Figure 7:
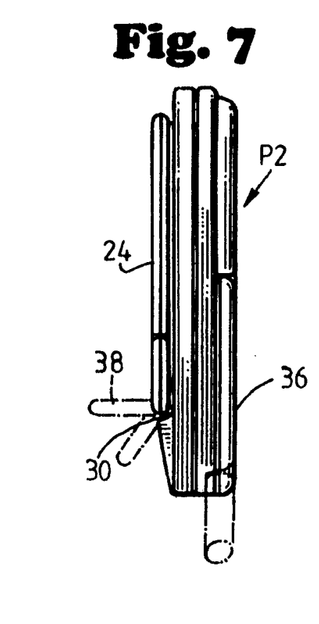
FIG. 7 is a side view of the computer of FIG. 6 with the keyboard installed.

Referring now to FIGS. 1, 2 and 3, three different views of a portable computer P1 according to the present invention are shown. The computer P1 includes a main housing 20. The main housing 20 contains the various components, with the exception of a keyboard 24, which are utilized in the computer P1. As seen, the housing 20 has a generally rectangular parallelepiped shape, except that the various edges may be partially rounded for aesthetics and ease of use. The main housing 20 contains a bottom or foot portion 22. Preferably this foot portion 22 is covered by a non-slip material 23 such as santoprene rubber. This non-slip material 23 is provided so that when the computer P1 is propped up at an angle, the main housing 20 does not slip, but remains in position. The keyboard 24 is preferably mounted overlaying a display 26 of the unit P1. The keyboard 24 is of a size that is conventionally used in notebook computers and is designed to overlay the display 26, conventionally an LCD display as used in notebook and notepad computers. In the computer P1 the display 24 also incorporates a digitizer which detects the positioning of a stylus as necessary for use as a notepad computer. Of course, many variations on the location of the digitizer are possible and many different digitizer technologies can be utilized. The main housing 20 contains a recess 28 which is mated with an extension 30 provided from the keyboard 24. The extension 30 is provided to help locate the keyboard 24 with relationship to the main housing 20 both during storage and during use. Preferably the extension 30 rotates with respect to the keyboard 24. Preferably the keyboard 24 also contains a series of non-slip feet 32 at its bottom front edge so that when the keyboard 24 is in use, the keyboard 24 does not slip. As can be seen in FIG. 3, the main housing 20 also includes an opening 34 for use with a floppy disk drive (not shown) located inside the housing 20. In this way a floppy disk can be inserted through the opening 34 and used by the computer P1.

The keyboard 24 is removable from the housing 20 such that if the computer P1 is desired to be used as a notepad, the keyboard 24 is simply stored and not utilized. If however it is desired to use the computer P1 as a notebook computer, the keyboard 24 can be installed such that the recess 28 receives the extension 30 as shown in FIG. 4. Additionally in this mode the main housing 20 includes a pivotable stand 36 located on the bottom side of the main housing 20. Preferably the hinge or pivot point 37 is not centered on the main housing 20 and includes several stop points or may be infinitely variable. In this manner the stand 36 can be rotated 180° as shown in outline in FIG. 2 and form a handle for conveniently carrying the computer P1. By having intermediate stop positions, the stand 36 can be used as shown in FIG. 4, where it provides a prop for the computer P1 so that the display 26 is readily visible by a user and the keyboard 24 is available at a convenient, comfortable angle for typing.

Optionally as shown in FIG. 5 the keyboard 24 can be remotely located from the main housing 20 and interface with the main housing 20 by means of a cable or electromagnetic communications, such as an RF or infrared link. For this use the keyboard 24 preferably includes a pair of legs 38 which can rotate to three positions. A first position is parallel with the keyboard 24 for use when the keyboard 24 is mated with the recess 28 as in FIG. 4 or is being stored on the main housing 20. A second position is one as shown in FIG. 5 where the legs 38 are preferably perpendicular to the main plane of the keyboard 24, to provide a first angle for the keyboard 24, such as preferably 12°. Preferably the legs 38 can also be rotated to a second angle as shown in FIG. 5 such that the keyboard 24 is at an angle of 6° to a horizontal surface. Both angles of the legs 38 allow the keyboard 24 to be located at a comfortable angle. It is of course understood that numerous other angles could be developed including a continuous change.

The software present inside the computer P1 is designed to cooperate with or without the keyboard 24. The user can select whether notepad or notebook mode or a combination of both is to be utilized. In this manner the software can accept either input and the user can use the system as desired.

Figure 8:
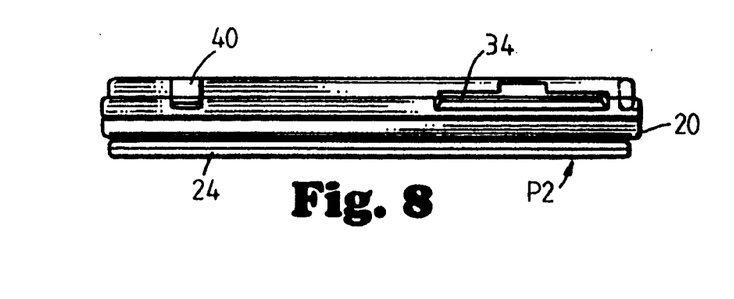
FIG. 8 is a front view of the computer of FIG. 6.

FIGS. 6, 7, 8 and 9 show an alternate embodiment of a personal computer according to the present invention, referred to as computer P2. In the description that follows, like elements between the various computers are shown and numbered with like numerals. For example, the computer P2 includes a main housing 20 which includes a recess 28 for receiving an extension 30 of the keyboard 24 and includes a display 26, the display 26 preferably including a overlay or appropriate sensing means for use of a stylus as a notepad computer. Additionally, the computer P2 includes a pivoting stand 36 and the keyboard 24 includes pivotable legs 38. As shown in FIG. 8, the particular computer P2 also includes a door 40 which is openable and covers a recess which can be used to store the stylus or pen used with the notepad computer format.

Figure 10:
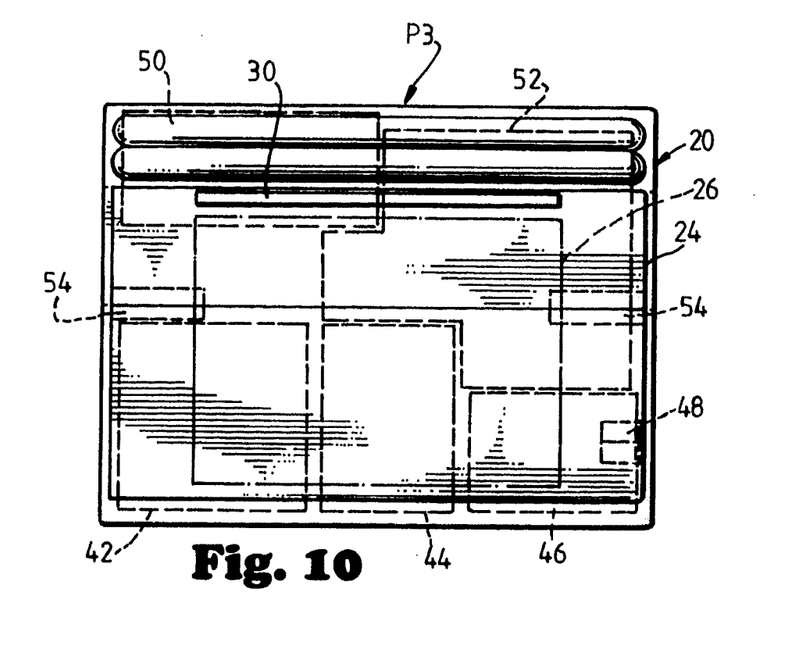
FIG. 10 is a top view of an alternate embodiment of a portable computer according to the present invention and showing in outline format the internal components of the computer.
Figure 11:
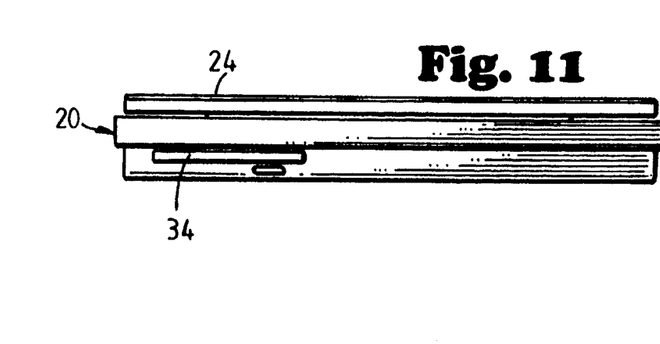
FIG. 11 is a front view of the computer of FIG. 10.
Figure 12:
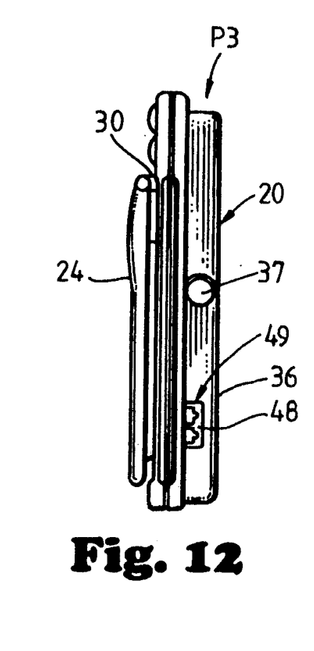
FIG. 12 is a right side view of the computer of FIG. 10.
Figure 13:
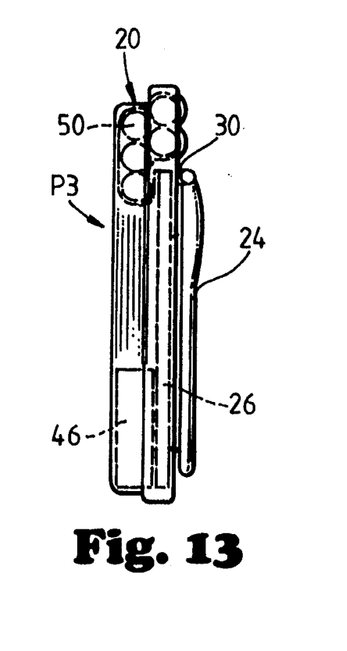
FIG. 13 is a left side view of the computer of FIG. 10.
Figure 14:
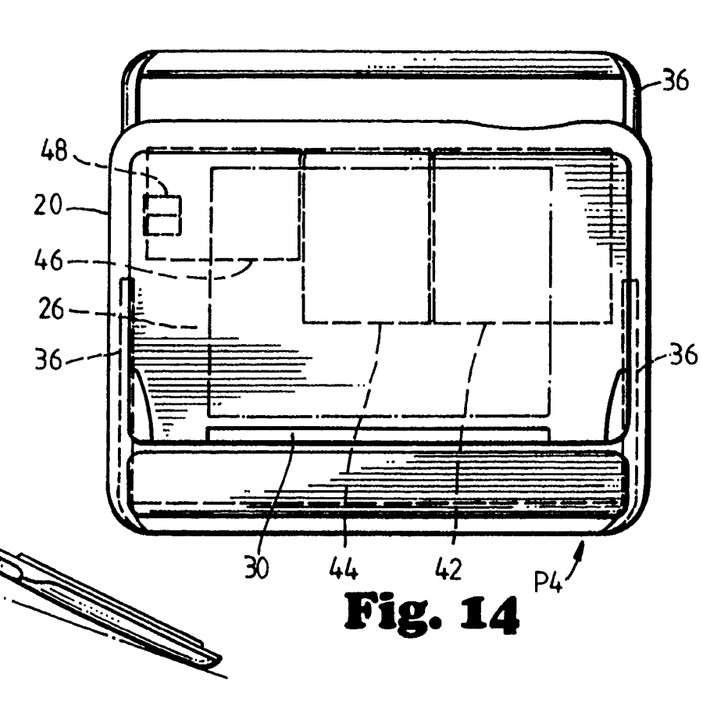
FIG. 14 is a top view of an alternate embodiment of a portable computer system according to the present invention and showing in outline format the location of particular components in the computer.
Figure 15:
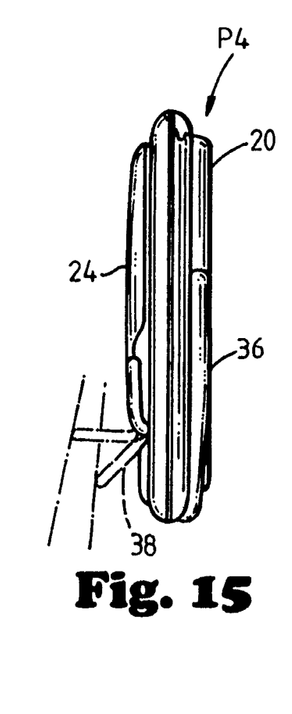
FIG. 15 is an end view of the computer of FIG. 14.
Figure 16:
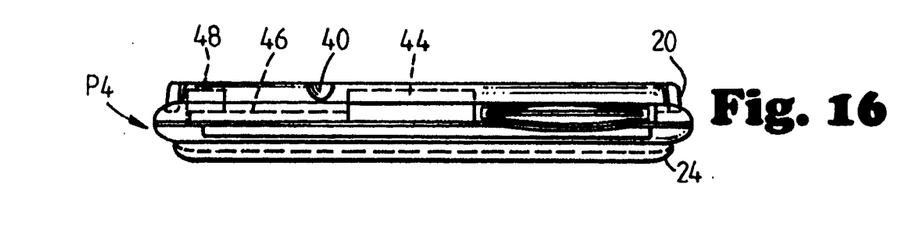
FIG. 16 is a front view of the computer of FIG. 14.

FIGS. 10, 11, 12 and 13 similarly show a third embodiment referred to as computer P3. Again like parts are numbered the same as computers P1 and P2. FIGS. 10 and 13 additionally show the location of various components inside the main housing 20 of the computer P3. For example, a floppy disk drive 42 is located at the left front portion of the computer P3, so that the opening 34 is appropriately placed. A hard disk drive unit 44 is preferably located at the center front, while a receptacle for an optional modem 46 is located at the right front. The modem 46 may contain standard telephone RJ11 jacks 48. The main housing 20 includes an opening 49 to allow access to the RJ11 jacks 48. Batteries 50 which are used to power the computer P3 are located preferably in the left rear of the unit P3. A computer circuit board 52 which contains the electronics for the computer P3 is preferably located in significant portions of the remaining area not occupied by the other devices. The modem 46, hard disk drive unit 44, the floppy disk drive 42 and the display 26 are all connected to the circuit board 52. The batteries 50 are connected to the circuit board 52, optionally through a DC—DC converter (not shown), and any other devices needing power, such as the display 26. It is also noted that hinge/clutch units 54 are provided inside the housing 20 to cooperate with the stand 36 so that the stand 36 operation is properly developed and the stand 36 can be positively restrained at all points between folded for notepad use and extended for carrying use. It is noted that the specific embodiment of computer P3 does not include arms 38 for the keyboard 24, but of course these could be added if desired.

Figure 17:
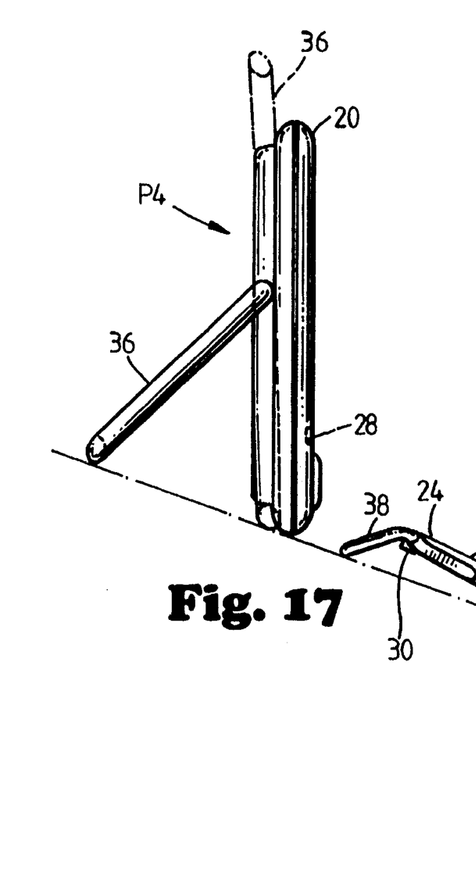
FIG. 17 is a side view of the computer of FIG. 14 with the keyboard in a remote location and the computer unit propped for viewing.

FIGS. 14, 15, 16 and 17 show a computer P4, a fourth alternative according to the present invention. As indicated, the keyboard 24 overlays the main housing 20 and incorporated display 26. In this embodiment the keyboard 24 includes the pivotable legs 38, while the main housing 20 includes a stand 36 which can be pivoted as shown in FIG. 17 to form a hand hold or carrying handle. This is more clearly shown in FIG. 14. Additionally, certain of the internal components as shown in the computer P3 are shown in the computer P4.

Figure 18:
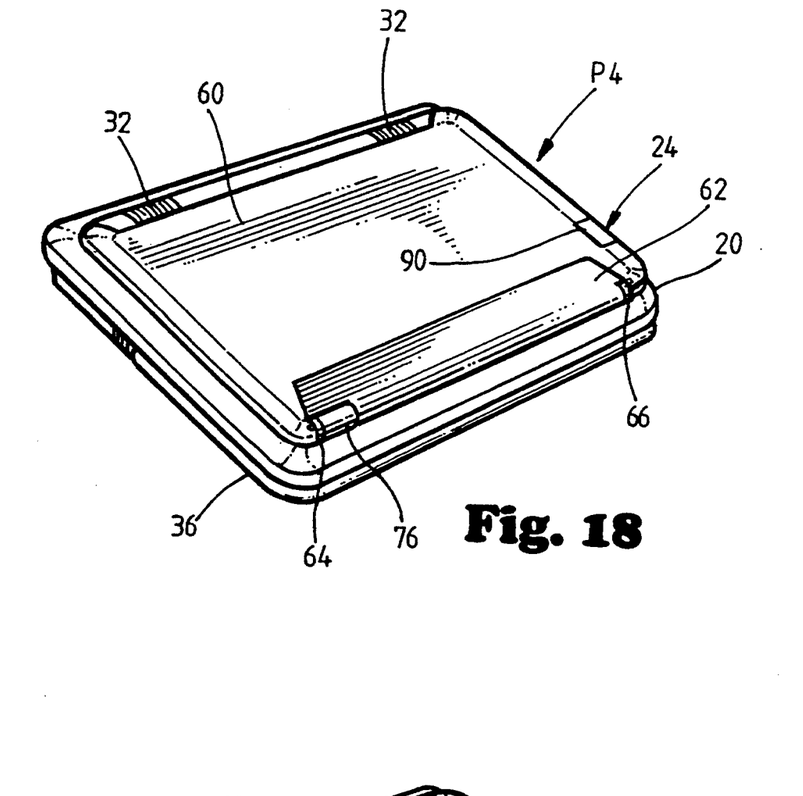
FIG. 18 is a perspective view of an alternate embodiment of a portable computer according to the present invention.
Figure 19:
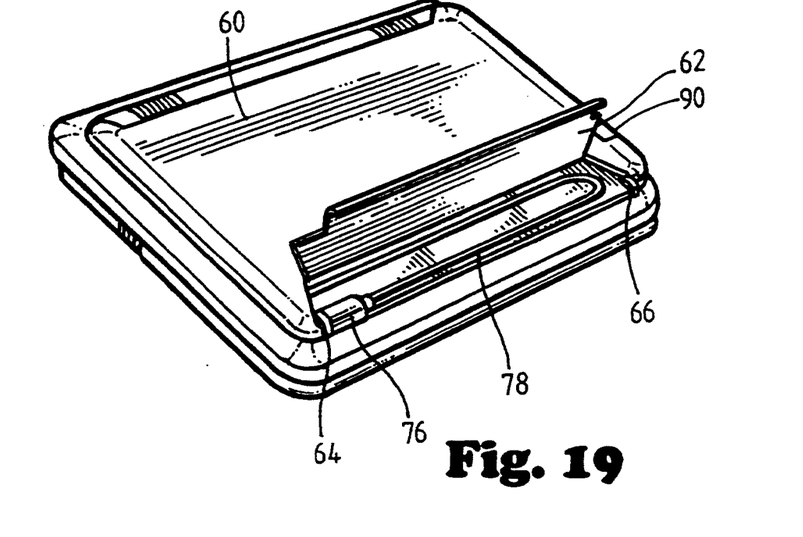
FIG. 19 is the view of FIG. 18 with the keyboard cable cover in the open position.
Figure 20:
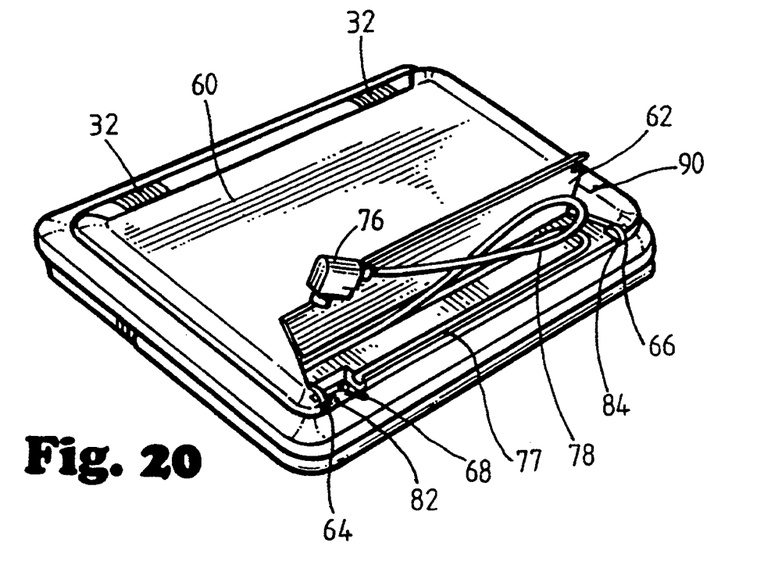
FIG. 20 is the view of FIG. 19 with the keyboard cable disconnected from the main housing.
Figure 21:
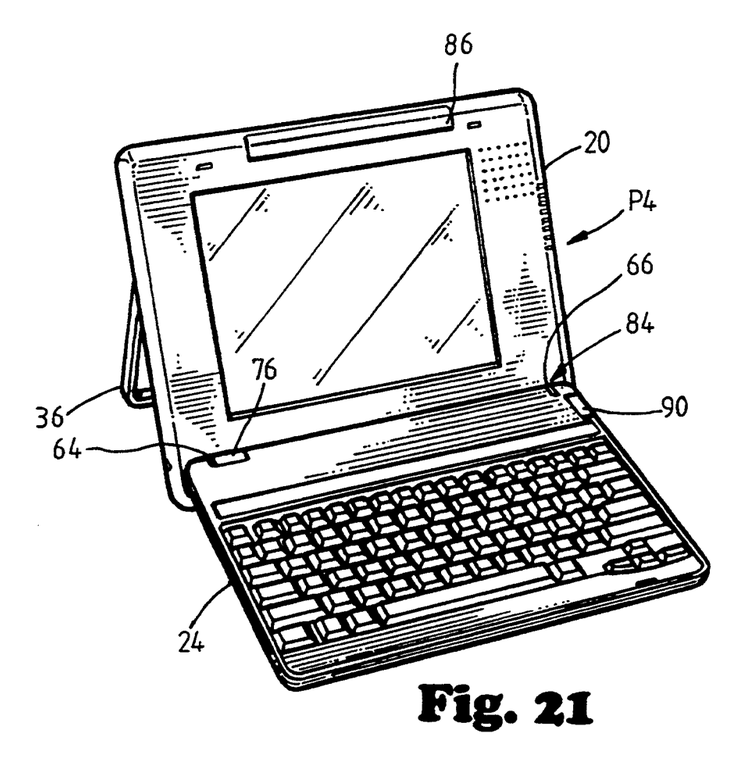
FIG. 21 is a perspective view of the portable computer of FIG. 18 with the keyboard connected to the main housing, which is propped at an angle.
Figure 22:
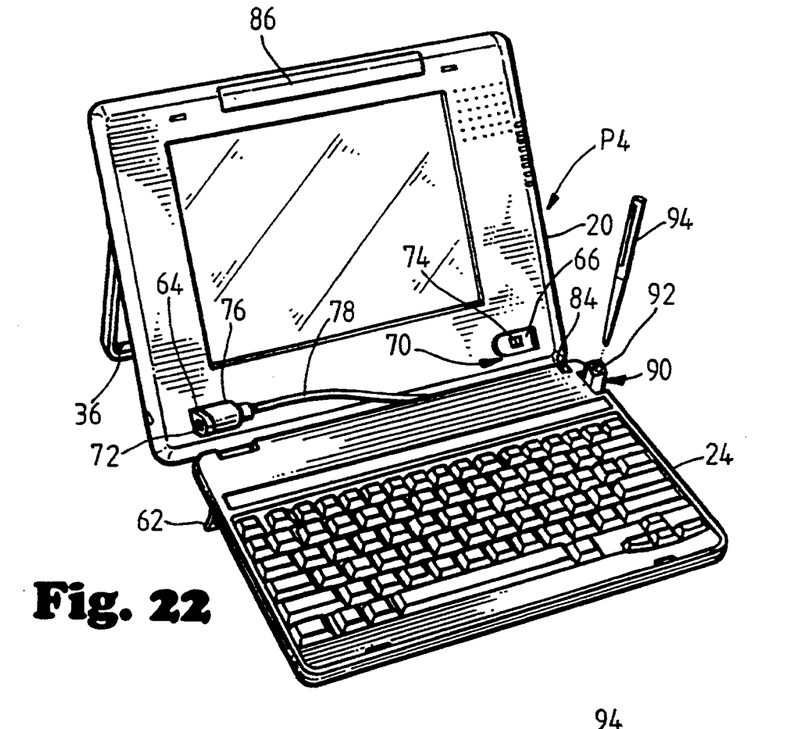
FIG. 22 is a perspective view of the portable computer of FIG. 18 with the keyboard detached and the main housing propped at an angle.

FIGS. 18, 19, 20, 21, 22, 23, 24 and 25 show a fourth and preferred embodiment referred to as computer P4. Again like parts are numbered the same. Computer P4 includes a variation on the connection of the keyboard 24 to the main housing 20. Referring now to FIGS. 18, 19 and 20, the bottom surface 60 of the keyboard 24 includes a keyboard cable cover 62. The cable cover 62 is pivotably connected to the keyboard 24 and is shown in a closed position in FIG. 18 and an open position in FIGS. 19 and 20. As shown in FIG. 22, when the keyboard 24 is detached from the main housing 20, the cable cover 62 is placed on an open position to act as a support or leg for the keyboard 24.

Figure 23:
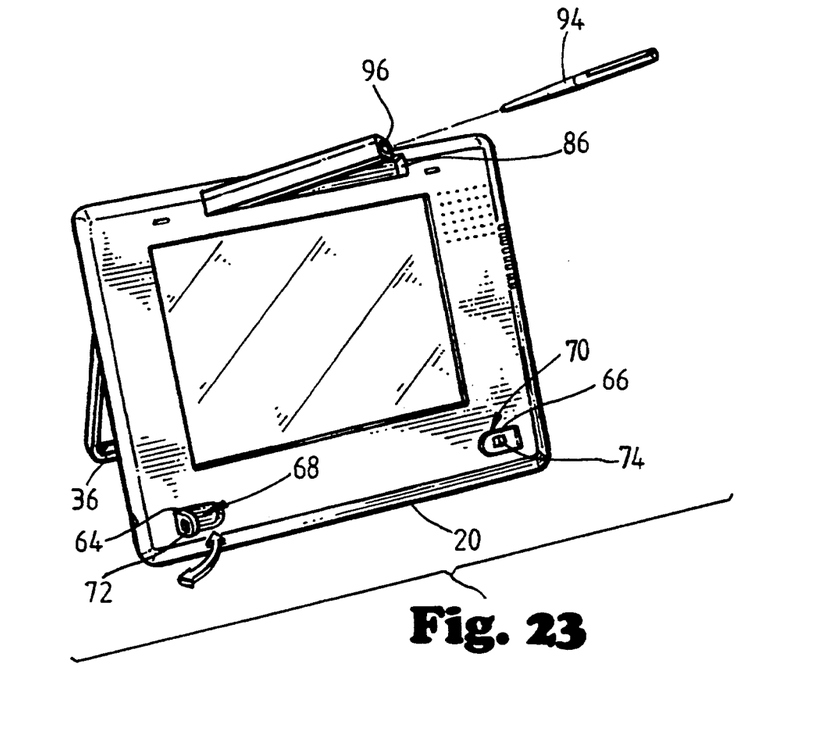
FIG. 23 is a perspective view of the portable computer of FIG. 18 with the keyboard removed and the main housing propped at an angle showing the keyboard connection tabs.

The keyboard 24 of the computer P4 is pivotably connected to the main housing 20 by way of two projectable tabs 64 and 66. As shown in FIG. 23, the tabs 64 and 66 are pivotably connected to the main housing 20 to allow them to be stored in recesses 68 and 70 when the keyboard 24 is detached and to project substantially normal to the main housing 20 when retaining the keyboard 24. Each tab 64 and 66 includes a projecting pin 72 and 74 which mates with the keyboard 24 to retain the keyboard 24 in a pivotable manner. The projecting pins 72 and 74 preferably have an oval profile having flat sides and rounded ends, oriented so that the long axis is substantially parallel to the main housing 20. The keyboard 24 includes slots (not shown) which mate with the projecting pins 72 and 74. The slots allow the key board to be removed from the pins 72 and 74 when the keyboard 24 is substantially perpendicular to the housing 20, and yet allow the keyboard 24 to be positively retained to prevent accidental release when in the folded position (FIGS. 18-20) and when attached to the main housing 20 as in FIG. 21. The pins 72 and 74 further allow the keyboard 24 to be pivoted from a closed position as in FIG. 18 to an open and attached position in FIG. 21, with the pivoting stand 36 supporting the main housing 20.

The tab 64 is retained in the normal position by a connector 76 on a keyboard cable 78. As seen in FIGS. 19 and 20, the keyboard 24 includes a cavity 80 under the cable cover 62 to store the keyboard cable 78. FIG. 20 also shows that the keyboard 24 contains a serpentine recess 77 to receive the keyboard cable 78. A keyboard plug 82 is located at the bottom of the recess 68 to receive the connector 76. When the connector 76 is inserted in the recess 68, it maintains the tab 64 in position with the keyboard 24, the tab 66 begin maintained in position due to the size of a slot 84 in the keyboard 24 in conjunction with the locating provided by the connector 76.

Figure 24:
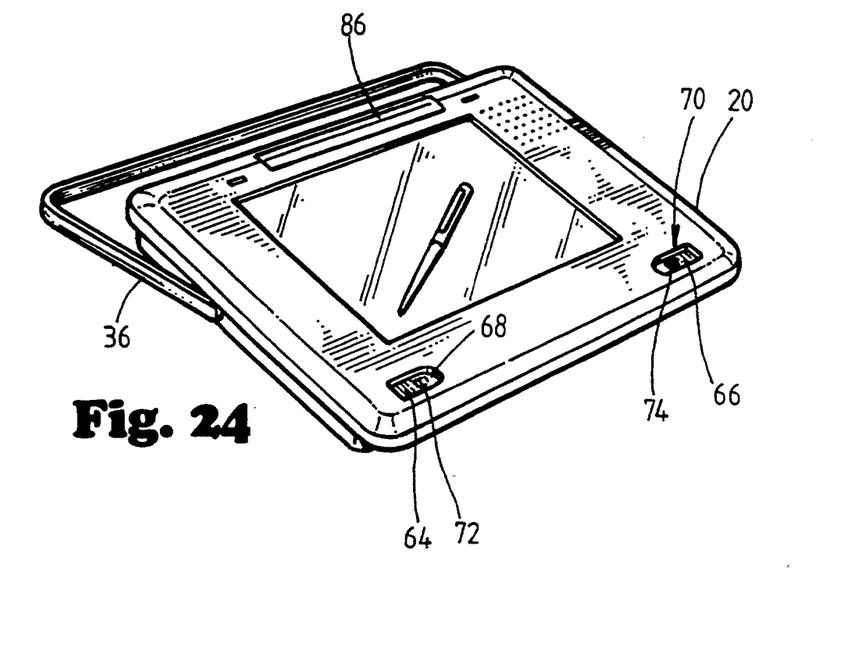
FIG. 24 is a perspective view of the portable computer of FIG. 18 arranged for pen input.

As shown in FIG. 24, the tabs 64 and 66 can then be folded into the recesses 68 and 70, which preferably have a depth such that the pins 72 and 74 do not project above the surface of the main housing 20.

When the keyboard 24 is detached, the connector 76 may be reinserted in the plug 82, with the cable cover 62 used as a keyboard support or leg. In this arrangement, as shown in FIG. 22, the keyboard 24 can be arranged and moved as desired.

The keyboard 24 also includes a pivoting stylus holder 90. The stylus holder 90 pivots from a closed position as shown in FIG. 21 to an open position as shown in FIG. 22. When the open position, a stylus receiving hole 92 is accessible so that a stylus 94 can be temporarily placed in the hole 92. The stylus holder 90 thus acts as a convenient location for the stylus 94, allowing the stylus 94 to be readily recovered, without having to look around on the desk, in a pocket or elsewhere.

To allow for traveling storage of the stylus 94, a stylus garage 86 is provided. When one end of the garage 86 is depressed, the garage 86 pivots as shown in FIG. 23. This reveals a stylus garage cavity 96. The cavity 96 is preferably the length of the stylus 94 or slightly greater to fully receive the stylus 94, unlike the stylus hole 92 which only partially receives the stylus 94. Then when the stylus 94 is fully inserted in the cavity 96, the projecting end of the garage 86 can be depressed to return the garage 86 to the closed position, thus securely retaining the stylus 94.

Figure 25:
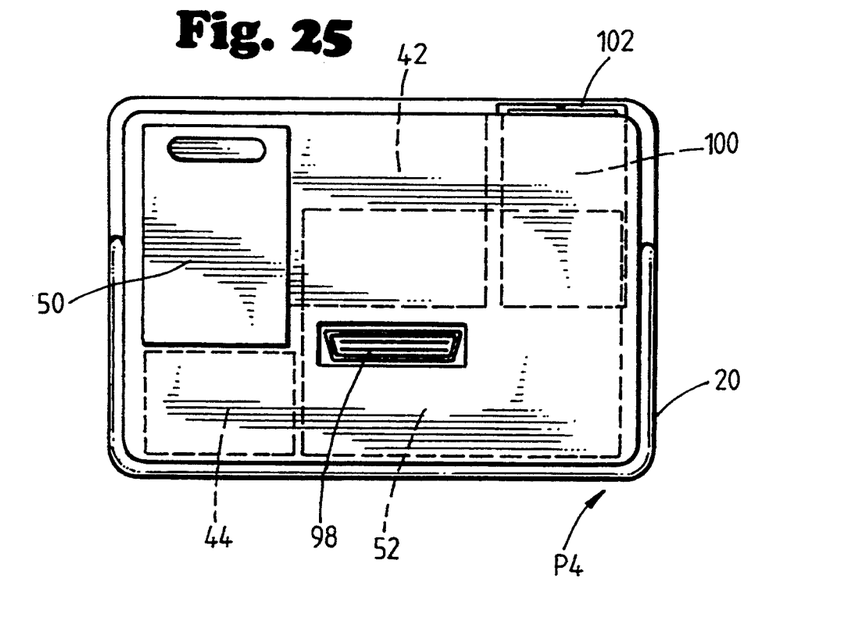
FIG. 25 is a bottom view of the portable computer of FIG. 18 showing in outline format the internal components of the computer.

The internal arrangement of the components is shown in FIG. 25. A floppy disk drive 42 is in the top center, while a battery pack 50 is adjacent, preferably to the left as seen from the bottom. Below the battery pack 50 is the hard disk drive unit 44. Adjacent the hard disk drive unit 44 and partially overlaying the floppy disk drive 42 is the computer circuit board 52, preferably with an expansion connector 98 located in approximately the center. The remaining area is preferably provided to house a PCMCIA card cage 100, with the card cage 100 partially overlaid by the circuit board 52 and with a door 102 providing access to the card cage 100 for the installation and removal of PCMCIA standard cards. Preferably the card cage 100 provides slots for two Type I or II cards, one preferably being a modem or fax/modem, or one Type III card.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A combined notebook and notepad computer comprising:

a main housing having a generally rectangular parallelepiped shape and having a rectangular opening;
a display located inside said main housing and behind said main housing opening so that said display is visible and accessible;
an electronic circuit board located inside said main housing and containing the electronic circuitry of the computer, said display coupled to said circuit board;
batteries located inside said main housing and connected to said electronic circuit board to provide power for the computer;
a removable keyboard;
means for pivotably connecting said main housing and said removable keyboard, wherein said means for pivotably connecting is adapted to allow said keyboard to be located in a first position over said main housing in a position overlaying said display and to be pivoted to a second position wherein said keyboard is in a position extending from said main housing at an angle; and
a pivotable stand connected to said main housing, wherein in a first position said stand is parallel with said main housing and the computer is used as a notepad computer and in a second position said stand is angled from said main housing to act as a prop for supporting said main housing when said main housing is placed in a generally standing orientation for use as a notebook computer.

2. The computer of claim 1, wherein said display further includes digitizing means to allow detection of location and motion of a stylus.

3. The computer of claim 1, wherein said means for pivotably connecting includes a recess in said main housing and an extension on said keyboard, and keyboard extension mating with said main housing recess and said keyboard extension pivotable between a first position and a second position corresponding to said first and second positions of said keyboard and wherein when said stand is in said second position, said keyboard extension is in said second position and said keyboard is mated with said main housing recess, said keyboard is at an angle comfortable for typing.

4. The computer of claim 1, wherein in a third position said stand is parallel with said main housing and a portion of said stand projects past said main housing to form a handle for carrying the computer.

5. The computer of claim 4, wherein said stand is pivotable from said first to said second to said third positions and all points between and said stand includes means for restraining said stand at any of said points.

6. The computer of claim 1, wherein said keyboard further includes a pivotable leg, said leg pivotable to at least two positions, a first position being generally aligned with said keyboard for storage purposes and a second position generally projecting from said keyboard, so that when said keyboard is placed on a horizontal surface, said leg places said keyboard at a first angle comfortable for typing.

7. The computer of claim 6, wherein said keyboard has two such pivotable legs.

8. The computer of claim 7, wherein said keyboard legs have a third position generally projecting from said keyboard at an angle different from said second position, so that when said keyboard is placed on a horizontal surface, said legs place said keyboard at a second angle comfortable for typing.

9. The computer of claim 1, further comprising:
a hard disk drive located inside said main housing and connected to said electronic circuitry.

10. The computer of claim 9, further comprising:
a floppy disk drive located inside said main housing and connected to said electronic circuitry,
wherein said main housing further includes an opening aligned with said floppy disk drive to allow insertion of floppy disks into said floppy disk drive.

11. The computer of claim 9, further comprising:
a modem located inside said main housing and connected to said electronic circuitry, wherein said main housing further includes an opening aligned with said modem to allow connection of modular telephone lines to said modem.

12. The computer of claim 1, wherein said means for pivotably connecting includes two tabs connected to said main housing, each having a pin projecting therefrom, and wherein said keyboard includes mating elements for mating with said tab projecting pins.

13. The computer of claim 12, wherein said main housing includes a recess adjacent each of said tabs and wherein said tabs are pivotably connected to said main housing so that said tabs are pivotable into said recesses.

14. The computer of claim 12, wherein said keyboard mating elements are removably connectable to said projecting pins.

15. The computer of claim 1, wherein said removable keyboard includes a stylus holder pivotably connected to provide a closed position and an open position and wherein said stylus holder includes a recess accessible for receiving the stylus when in the open position and inaccessible in the closed position.

16. The computer of claim 15, wherein said stylus holder recess is of a length to receive only a portion of the stylus.

17. The computer of claim 1, wherein said main housing includes a stylus holder pivotably connected to provide a closed position and an open position and wherein said stylus holder includes a recess accessible for receiving the stylus when in the open position and inaccessible in the closed position.

18. The computer of claim 17, wherein said stylus holder recess is of a length and size to receive the entire stylus.

19. The computer of claim 1, wherein said keyboard includes a cable for connection to said electronic circuit board, wherein said electronic circuit board includes a connection for receiving said cable from said keyboard, and wherein said keyboard further includes a recess for receiving and storing said cable and a pivotable cover over said recess.

20. The computer of claim 19, wherein said pivotable cover is located on the bottom surface of said keyboard at the rear of said keyboard and pivots in a forwardly direction.

21. The computer of claim 20, wherein said cover is sized to form a leg for said keyboard when pivoted in the forward direction, so that when said keyboard is placed on a horizontal surface, said cover places said keyboard at an angle comfortable for typing.

* * * * *